US012377012B2

(12) United States Patent
Doshi

(10) Patent No.: US 12,377,012 B2
(45) Date of Patent: Aug. 5, 2025

(54) CRUTCHES ON WHEELS

(71) Applicant: Navin Doshi, Los Angeles, CA (US)

(72) Inventor: Navin Doshi, Los Angeles, CA (US)

( * ) Notice: Subject to any disclaimer, the term of this patent is extended or adjusted under 35 U.S.C. 154(b) by 0 days.

(21) Appl. No.: 18/439,736

(22) Filed: Feb. 12, 2024

(65) Prior Publication Data

US 2024/0374459 A1 Nov. 14, 2024

Related U.S. Application Data

(63) Continuation-in-part of application No. 29/928,338, filed on Feb. 9, 2024.

(60) Provisional application No. 63/466,312, filed on May 14, 2023.

(51) Int. Cl.
*A61H 3/04* (2006.01)

(52) U.S. Cl.
CPC ......... *A61H 3/04* (2013.01); *A61H 2003/046* (2013.01); *A61H 2201/0161* (2013.01); *A61H 2201/0192* (2013.01); *A61H 2201/1635* (2013.01)

(58) Field of Classification Search
CPC .......................... A61H 3/04; A61H 2201/1635
See application file for complete search history.

(56) References Cited

U.S. PATENT DOCUMENTS 130,283 A * 8/1872 Darrach .................. A61H 3/04 482/67
1,307,058 A * 6/1919 McGrath .................. A61H 3/04 135/85
1,394,224 A * 10/1921 Milton ..................... A61H 3/04 135/67
2,297,173 A * 9/1942 Shipman .................. A61H 3/04 482/67
2,459,066 A * 1/1949 Duke ....................... A61H 3/04 297/5
2,792,874 A 5/1957 Sundberg
2,843,180 A 7/1958 Schwartz
3,002,761 A 10/1961 Sundberg
(Continued)

FOREIGN PATENT DOCUMENTS

CA 204459 S 1/2023
GB 2493954 A 2/2013
(Continued)

OTHER PUBLICATIONS

Amazon-Retaoldth, posted May 24, 2024 [online], [retrieved Aug. 14, 2024]. Retrieved from internet, https://www.amazon.com/Retaoldth-Rollator-Lightweight-Foldable-Mobility/dp/B0D52N22ZF (Year: 2024).
(Continued)

*Primary Examiner* — Noah Chandler Hawk
(74) *Attorney, Agent, or Firm* — The Roy Gross Law Firm, LLC; Roy D. Gross

(57) ABSTRACT

A wheeled walker with underarm support for assisting people with mobility issues including a frame, two vertical support struts extending upwards from the frame, the two vertical support struts being adjustable, and two adjustable in height horizontal arms connected to the two vertical support struts, wherein when the two adjustable horizontal arms are placed under a user's arms at the armpits, the two adjustable horizontal arms provide weight support and stability to the user.

9 Claims, 8 Drawing Sheets

(56) References Cited

U.S. PATENT DOCUMENTS

| | | | | |
|---|---|---|---|---|
| 4,187,869 | A | 2/1980 | Marchetti | |
| 4,341,381 | A * | 7/1982 | Norberg | A61H 3/04 482/67 |
| 4,342,465 | A | 8/1982 | Stillings | |
| D281,771 | S | 12/1985 | Webb | |
| 5,174,590 | A | 12/1992 | Kerley et al. | |
| 5,356,237 | A | 10/1994 | Sung | |
| 5,476,432 | A | 12/1995 | Dickens | |
| D420,624 | S | 2/2000 | Gonzalez | |
| 7,275,554 | B2 * | 10/2007 | Mullholand | A61H 3/008 135/67 |
| D561,065 | S | 2/2008 | Kindberg et al. | |
| 7,743,779 | B2 | 6/2010 | Gee, Sr. | |
| 8,166,988 | B1 | 5/2012 | Martin | |
| 8,267,412 | B2 | 9/2012 | Liu | |
| 9,554,962 | B1 | 1/2017 | Smith | |
| 9,610,210 | B2 | 4/2017 | Swiniarski | |
| 10,391,018 | B1 | 8/2019 | Fitzwater | |
| 10,555,866 | B2 * | 2/2020 | Pan | A61H 3/04 |
| 10,588,815 | B2 | 3/2020 | Fellingham et al. | |
| 10,973,730 | B2 * | 4/2021 | Fellingham | A61H 3/04 |
| D940,601 | S | 1/2022 | Li | |
| D974,241 | S | 1/2023 | Wei | |
| D976,765 | S | 1/2023 | Savioli et al. | |
| D977,373 | S | 2/2023 | Li | |
| D1,035,505 | S | 7/2024 | Luo | |
| 2002/0140196 | A1 | 10/2002 | Crouch et al. | |
| 2003/0137119 | A1 * | 7/2003 | Razon | A61H 3/008 280/87.021 |
| 2005/0183759 | A1 | 8/2005 | Wolfe | |
| 2006/0033297 | A1 | 2/2006 | Miller | |
| 2007/0023073 | A1 * | 2/2007 | Su | A61H 3/04 482/68 |
| 2009/0224499 | A1 | 9/2009 | Dashew et al. | |
| 2010/0126542 | A1 | 5/2010 | Pennise | |
| 2013/0334784 | A1 * | 12/2013 | Pak | A61H 3/00 280/87.041 |
| 2016/0058648 | A1 | 3/2016 | Soulakis | |
| 2018/0133094 | A1 | 5/2018 | Helfer | |
| 2019/0183719 | A1 | 6/2019 | Koscielski et al. | |
| 2019/0209418 | A1 * | 7/2019 | VanAusdall | B62B 5/0438 |
| 2019/0231632 | A1 * | 8/2019 | Hoekelmann | B60T 7/02 |
| 2019/0247266 | A1 * | 8/2019 | Pan | A61H 1/00 |
| 2022/0151860 | A1 | 5/2022 | Shugert et al. | |

FOREIGN PATENT DOCUMENTS

| | | |
|---|---|---|
| KR | 20190077679 A | 7/2019 |
| TW | 94301458 | 5/2006 |
| WO | D097910-001 | 4/2018 |
| WO | D202176-002 | 8/2019 |

OTHER PUBLICATIONS

Amazon-Cartsafe, posted Jan. 25, 2024 [online], [retrieved Aug. 14, 2024]. Retrieved from internet, https://www.amazon.com/Upright-Walker- 330-lbs-Capacity/dp/B0CT94TFZ7 (Year: 2024).

MojoWalker, posting date N/A [online], [retrieved Aug. 14, 2024]. Retrieved from internet, https://mojosuperwalker.com/ (Year: 2024).

* cited by examiner

CRUTCHES ON WHEELS

CROSS REFERENCE TO RELATED APPLICATIONS

The present patent application claims priority to related U.S. Patent Application Ser. No. 63/466,312, filed May 14, 2023, entitled "WALKING AIDE", and U.S. Design patent application Ser. No. 29/928,338 filed Feb. 9, 2024. Both applications are incorporated by reference in their entireties.

FIELD OF THE INVENTION

The present invention relates to a wheeled walker with underarm support; for assisting people with mobility issues. More specifically, the present invention relates to a wheeled walker design which addresses walker stability issues by limiting the length of horizontal arms for armpit support; and including foldable bars with additional wheels for additional support.

BACKGROUND

Medical walkers, canes, and crutches are commonly used by people with mobility issues to provide support and stability while walking. However, current designs present problems with stability and user adaptability. The present invention solves these problems by introducing new elements that provide increased stability, accommodating differing user heights and needs, and increasing user mobility.

Beginning with the common and standard crutch or forearm crutch, known systems have several disadvantages. Physically frail or weak patients are generally unable to adequately support themselves using their arms and hands for extended periods; therefore, arm crutches are primarily given to healthy or stronger patients who have been injured or are post-surgery, rather than for the elderly or those with neurological difficulties.

Known walkers with wheels are normally provided to support a user as they press down with their arms and hands to prevent a fall. However; for many known walker users, an attendant must support a person from behind who is using a known walker; typically, with the attendant's hands at the person's shoulders, at the back of the person's arm, or at a person's sides at the torso and under the arms. The current invention overcomes the deficiencies in the prior-art by proving with the inventive walker support to a person at the back of the arms and under the armpits.

SUMMARY OF THE INVENTION

The invention overcomes the problem of a user falling to provide additional support for a user prior to and to prevent a fall.

It is an object of the present invention to provide a wheeled walker comprising: a frame; two vertical support struts extending upwards from the frame, the two vertical support struts being adjustable; and two adjustable in height horizontal arms connected to the two vertical support struts, wherein when the two adjustable horizontal arms are placed under a user's arms at the armpits, the two adjustable horizontal arms provide weight support and stability to the user.

It is an object of the present invention to provide the instant walker, further comprising foldable bars with small wheels attached to the support struts, wherein the foldable bars provide additional stability and prevent tilting of the walker during use.

is an object of the present invention to provide the instant walker, wherein the length of the horizontal arms does not cross the vertical plane encompassing the rear wheels of the walker.

It is an object of the present invention to provide the instant walker, wherein the length of the horizontal arms prevents the rear wheels from becoming a fulcrum and the raising up the front walker wheel which may result in the walker user to fall backwards.

It is an object of the present invention to provide the instant walker, where the horizontal arms are padded for comfort of use.

It is an object of the present invention to provide the instant walker, where the horizontal arms are ergonomically curved for comfort and effective ease of use.

It is an object of the present invention to provide the instant walker, wherein the walker has three wheels attached to the frame.

It is an object of the present invention to provide the instant walker, wherein the walker has four wheels attached to the frame.

In certain embodiments, for a wider walker configuration when the two vertical support struts are far apart, the horizontal arms may be adjusted and brought closer together in many different user desired configurations.

In certain embodiments, the horizontal arms have various configurations and various lengths.

It is an object of the present invention to provide the instant walker, where the walker is collapsible.

It is an object of the present invention to provide the instant walker, where the walker includes two sets of handles, the first set of handles being attached to the horizontal arms and the second set of handles being attached to the two vertical support struts.

It is an object of the present invention to provide the instant walker, where the walker includes at least one brake attached to each of the two sets of handles.

It is an object of the present invention to provide the instant walker, where the two adjustable in height horizontal arms have a proximal bend portion, the proximal bend portion being connectable to the two vertical struts.

It is an object of the present invention to provide the instant walker, where the frame comprises two rear curved segments connected at their distal end to two wheels, wherein the two rear curved segments are connected at their proximal ends to the two vertical struts.

It is an object of the present invention to provide the instant walker, where the frame further comprises two forward curved segments connected at their distal end to the two vertical struts, wherein the two forward curved segments are connected at their proximal ends to a single wheel.

It is an object of the present invention to provide the instant walker, where the two rear curved segments are curved upwards from their distal to proximal ends and the two forward curved segments are curved downwards from their distal to proximal ends.

It is an object of the present invention to provide the instant walker, where the walker is collapsible to take up less than have the volume of its volume when in an expanded state.

It is an object of the present invention to provide the instant walker, where the wheels are not configured to rotate.

As depicted, it is contemplated that the horizontal arms may be padded or include additional removable and replaceable pads for comfort of use.

It is an object of the present invention to provide a wheeled walker comprising: a frame; two vertical support struts extending upwards from the frame, the two vertical support struts being adjustable and lockable; and two adjustable and lockable in height and width horizontal arms connected to the two vertical support struts, wherein when the two adjustable and lockable in height and width horizontal arms are placed under a user's arms at the armpits, the two adjustable and lockable horizontal arms providing weight support and stability to the user.

DETAILED DESCRIPTION OF THE INVENTION

Figure 1:
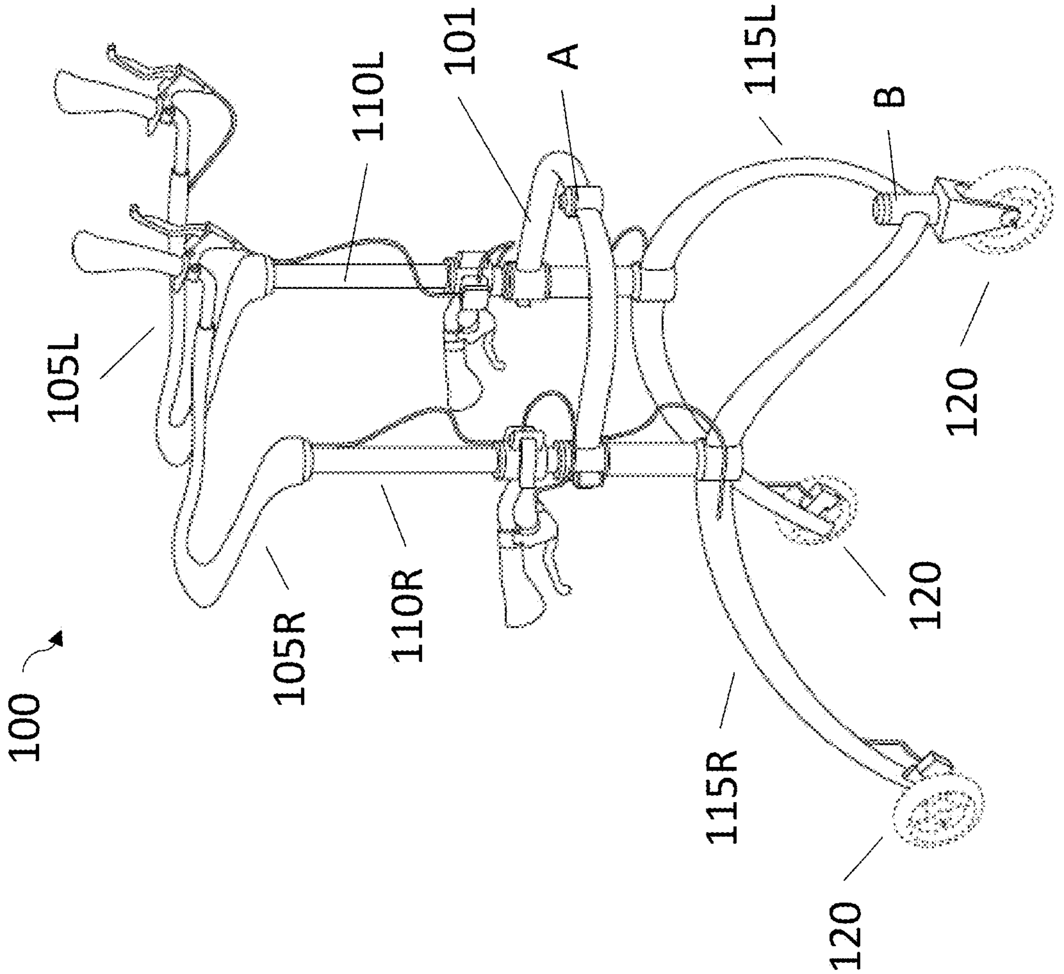
FIG. 1 is an orthogonal depiction of an embodiment of the invention.
Figure 2:
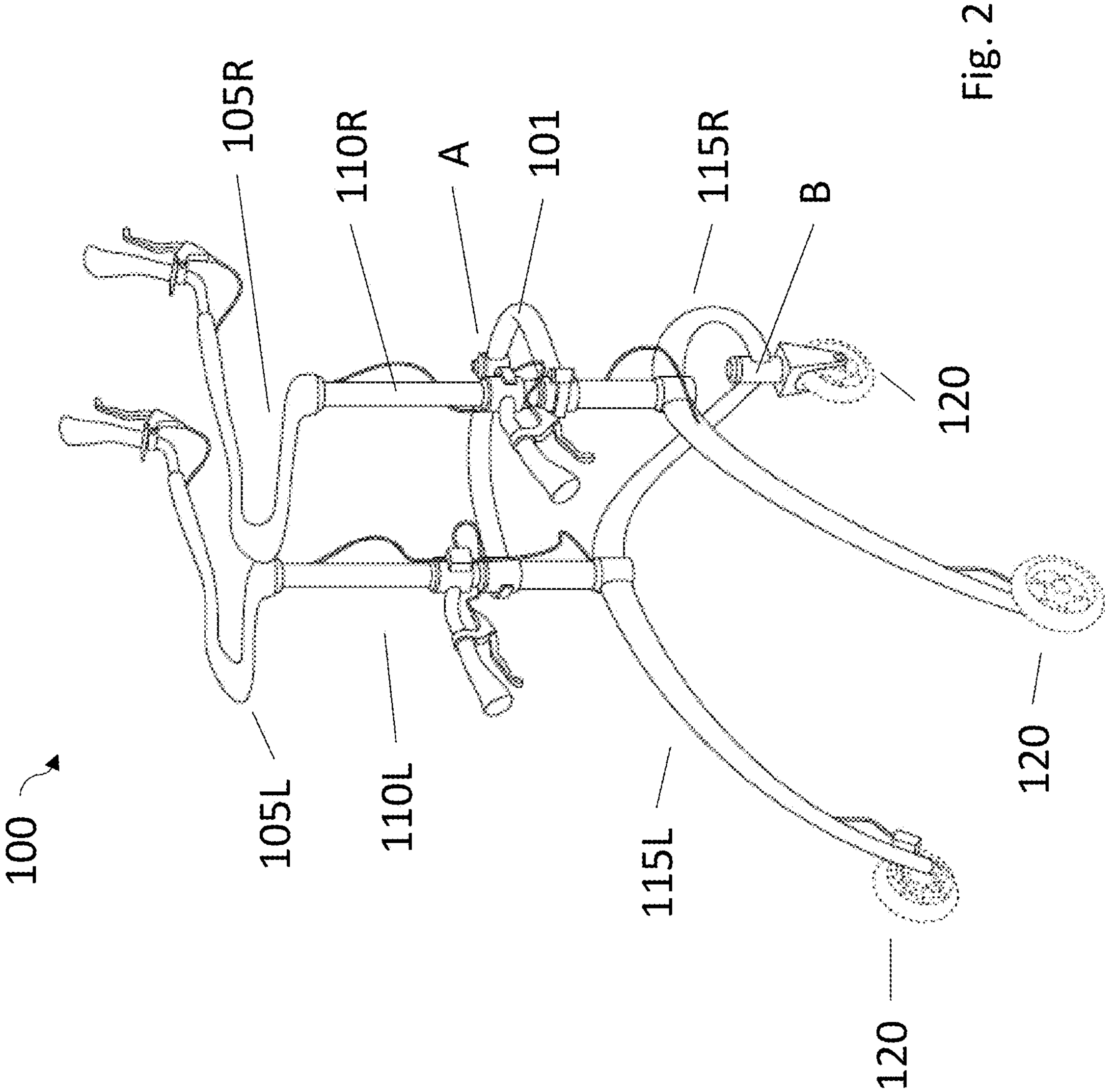
FIG. 2 is another orthogonal depiction of an embodiment of the invention.
Figure 3:
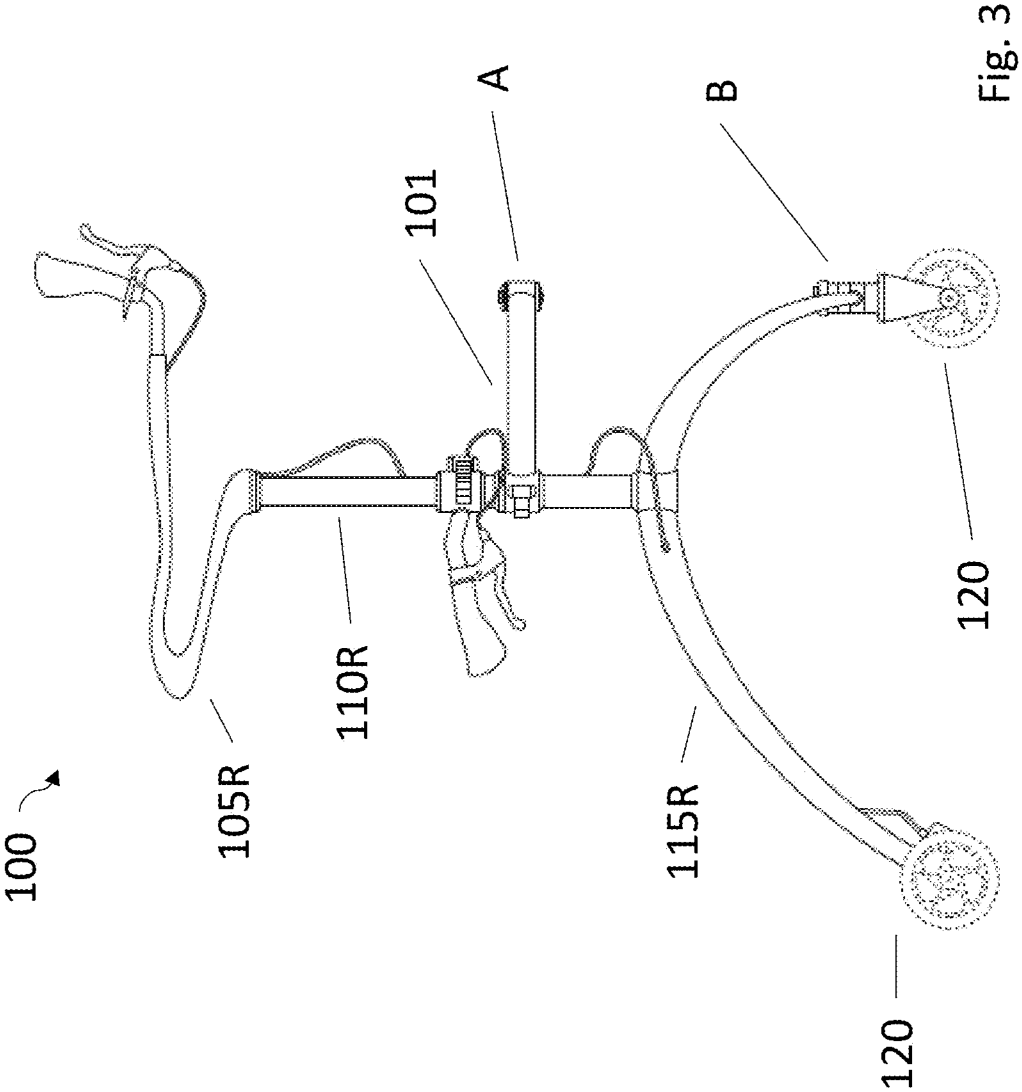
FIG. 3 is a side-view depiction an embodiment of the invention.
Figure 4:
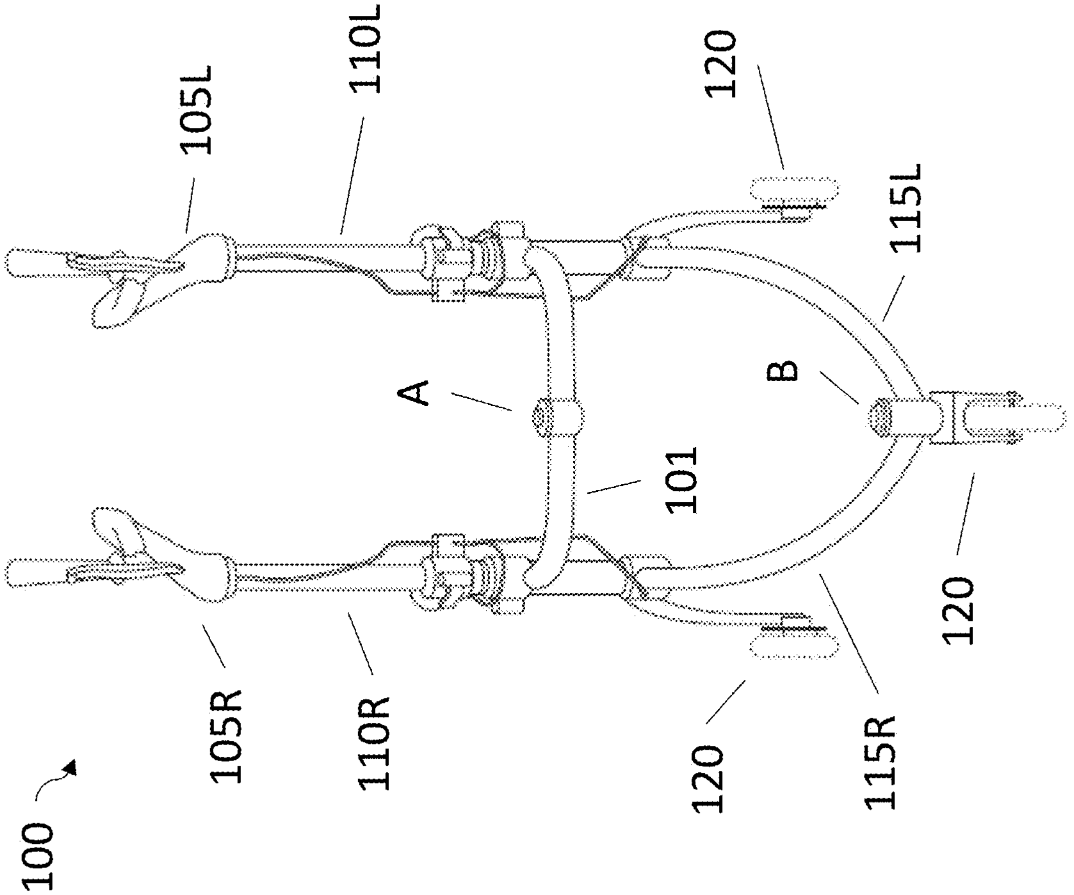
FIG. 4 is another orthogonal depiction of an embodiment of the invention.
Figure 5:
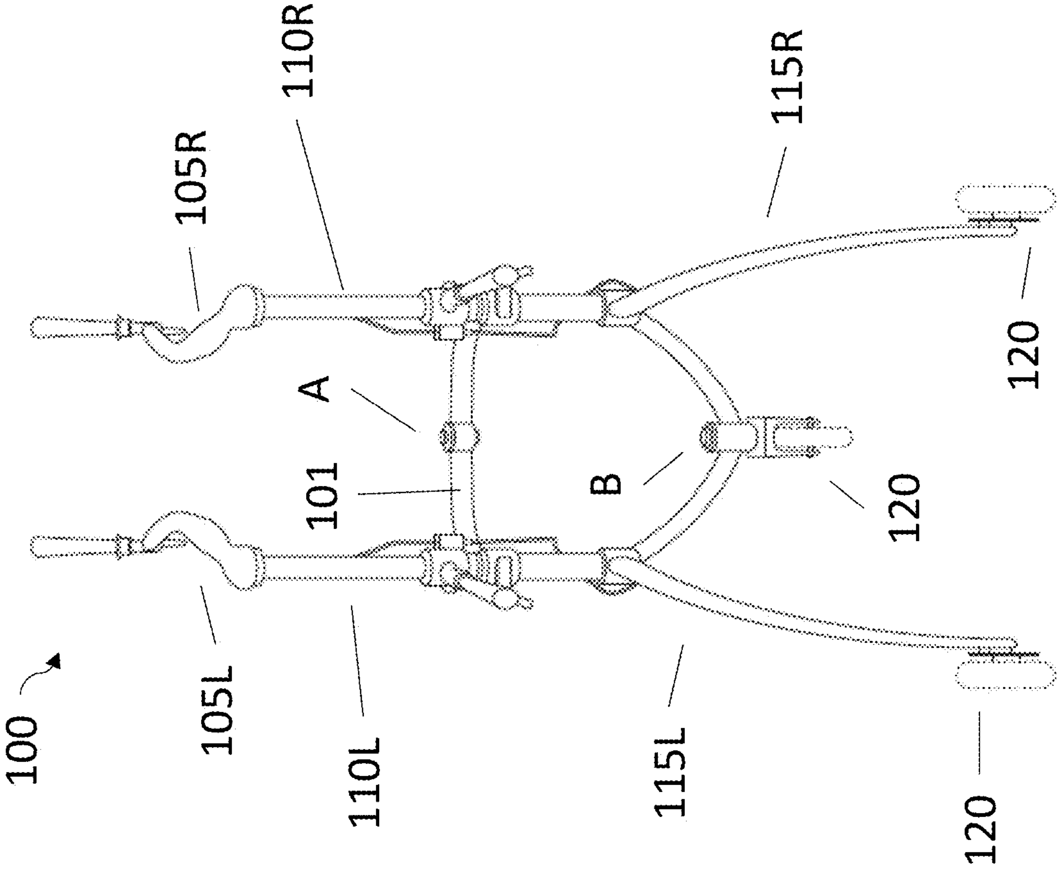
FIG. 5 is another orthogonal depiction of an embodiment of the invention.
Figure 6B:
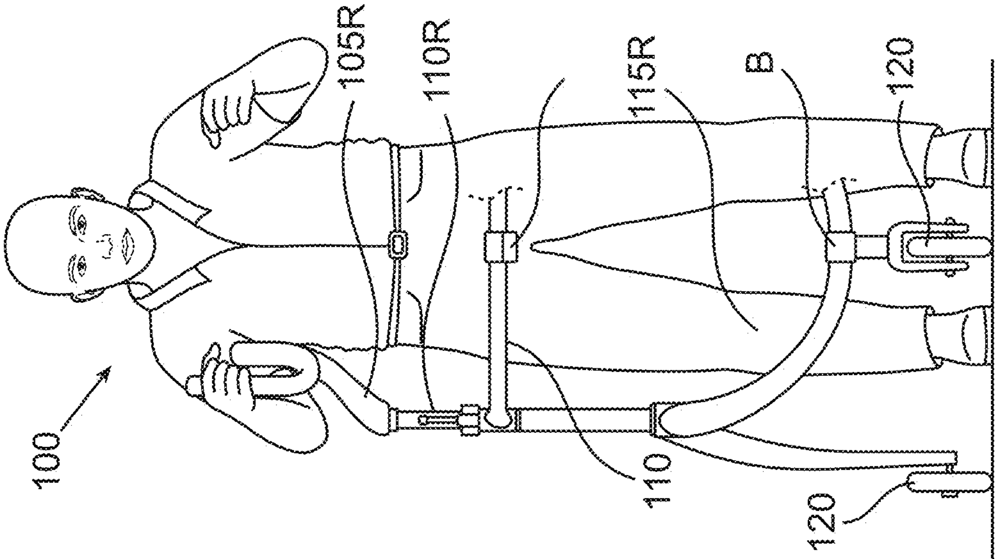
FIGS. 6A-6B are front and side-view depictions of an embodiment of the invention in use.
Figure 6A:
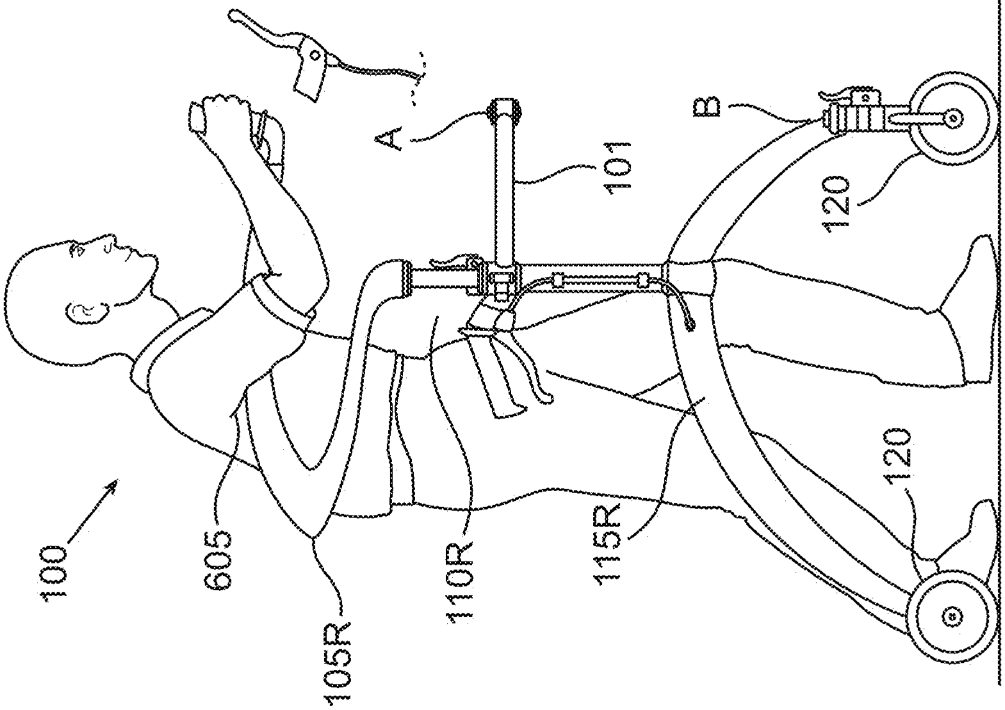
Figure 7:
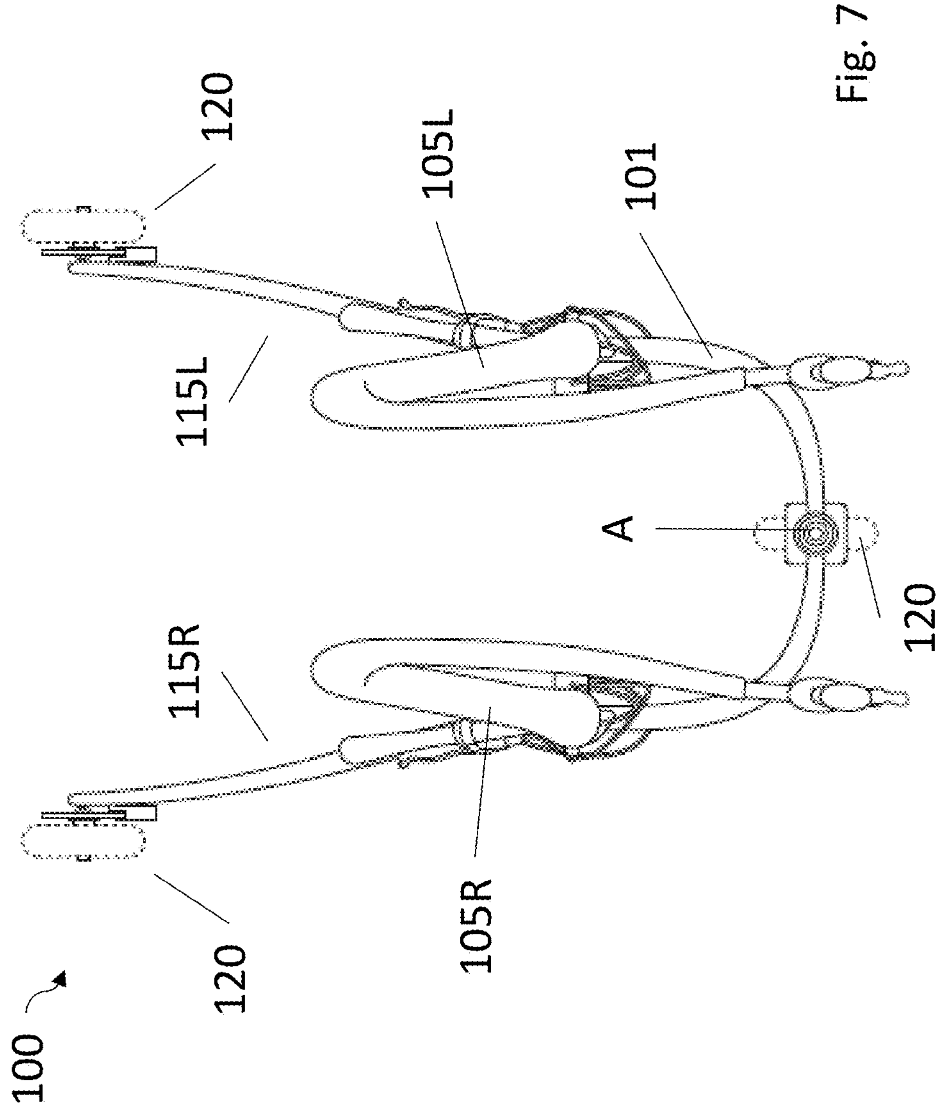
FIG. 7 is a top view depiction of an embodiment of the invention showing the frame of the walker open.

As depicted in the Figures; one embodiment the instant invention comprises a wheeled walker (100) including a frame (101) having two vertical support struts (110R, 110L) extending upwards from the frame (101), the two vertical support struts being adjustable in height and supporting two horizontal arms (105R, 105L) connected to the two vertical support struts (110R, 110L); where the two height adjustable horizontal arms (105R, 105L) are placed under a user's arms at the armpits (605), the two adjustable horizontal arms (105R, 105L) providing weight support and stability to the user.

The embodiment includes foldable bars (115R, 115L) including a plurality of wheels (120) to provide additional lateral stability and to prevent tilting of the walker (100) while in use.

As depicted in the Figures in one embodiment the inventive horizontal arms (105R, 105L) which provide arm and armpit support (605) are limited in length to the rear the walker (100) to prevent backward tipping while in use.

It is contemplated that the two vertical support struts (110R, 110L) and adjustable horizontal arms (105R, 105L) are made of durable and lightweight materials such as aluminum or carbon fiber.

It is contemplated that the inventive walker includes adjustable in width bars (115R, 115L) which include small wheels (120) providing additional stability and preventing walker tilting while in use. Using the small wheels (120) on the foldable bars (115R, 115L) allows a user to maneuver the walker (100) with ease and stability.

The adjustable horizontal arms (105R, 105L) for upper arm and armpit support (605) are designed and intended to prevent tipping of the walker (100). The rearward length of the adjustable horizontal arms (105R, 105L) is limited to prevent the rear wheels from becoming a fulcrum and raising up the front wheel of the walker.

It is contemplated that the adjustable horizontal arms (105R, 105L) are ergonomically shaped and/or adjustable to cradle a user's arms in a comfortable and efficient manner and position while the walker (100) is in use.

The adjustable horizontal arms (105R, 105L) should not cross the vertical plane of the rear wheels (120). The inventive configuration ensures that the user's center of gravity remains close to the walker's center of gravity.

It is contemplated that the distance between the rear wheels and the vertical plane encompassing them may be adjusted and optimized for stability via adjusting the frame (101) at points A and B. A wider or farther distance between the two rear wheels (120) is provided via adjusting and locking the frame (101) at points A and B; thus, increasing walker (100) side-to-side stability provided to a user. If less side-to-side stability is desired; the rear wheels (120) may be adjusted and locked closer together, also providing ease of use in physically narrow walking areas.

A greater distance between wheels provides better stability of the walker overall; and allows for lateral adjustment of the distance between the rear wheels (120) according to the needs of a user.

Figure 8:
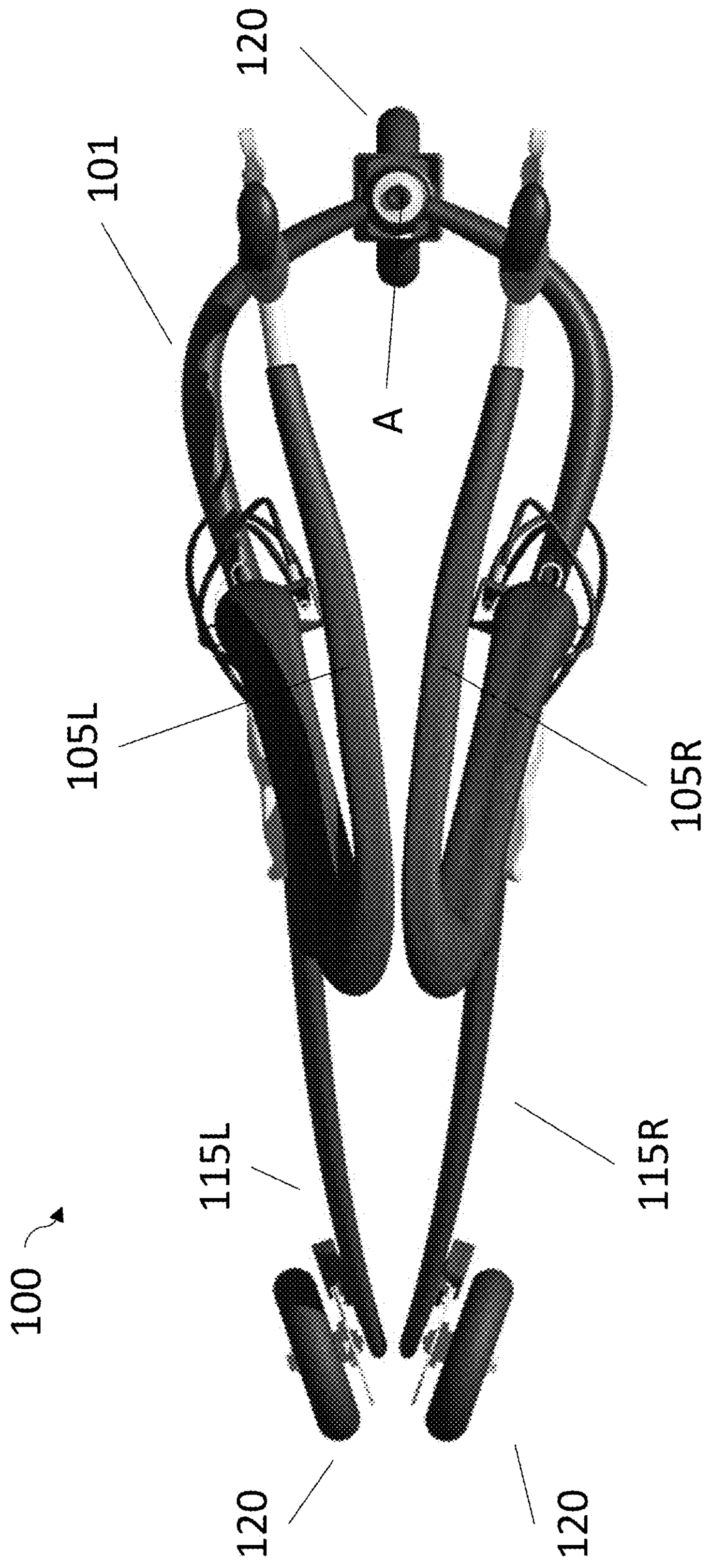
FIG. 8 is a top view depiction of an embodiment of the invention showing the frame of the walker folded.

As depicted in FIG. 8; it is contemplated that the inventive walker (100) for space-saving storage; may be fully foldable and lockable at frame (101) points A and B.

It is contemplated that the two vertical support struts (110R, 110L) are adjustable and lockable in height to place the horizontal arms (105R, 105L) to provide secure upper arm and armpit support (605) of and for a user at a desired height based on the need of a specific user.

For example; a user would adjust the width of the walker (100) frame (101) via points A and B, and adjust the height of the horizontal arms (105R, 105L) via the two vertical support struts (110R, 110L) as desired to secure upper arm and armpit support (605)—while walking.

Via the inventive adjustability of the width and height of the horizontal arms (105R, 105L), and via the inventive adjustability and ergonomic shape of the horizontal arms (105R, 105L); it is contemplated that a user "puts on" or "gets into" the inventive walker (100) being able to customize "the fit" via the inventive adjustable width of the walker frame (101) and height and shape of the horizontal arms (105R, 105L)

Additionally, it is contemplated in certain embodiments of the walker is weighted and/or heavier toward the bottom of the walker to provide more user stability overall.

Additionally, it is contemplated that the walker has a three pronged base with 3 wheels, one front wheel and two rear wheels.

As shown in FIG. 1, the walker is collapsible along joint elements A and B. The walker is shown having a set of bottom handles for the user to hold as well as brake elements (similar to bike brake) that cause the wheels to lock.

The walker also has a of top handles for the user to hold as well as brake elements (similar to bike brake) that cause the wheels to lock. Having both bottom and top handles allows the user additional stability and control of the walker.

The top handles are connected to an ergonomic upper support that leads to the top handles whereby the ergonomic support can fit under a user's armpits to allow for the user to put his or her weight on the walker device.

Furthermore, as shown in FIG. 1, the walker element A connects two ends of a support used to hold the weight of a user, while also being collapsible for storage. The support is curved for easier collapsibility and storage.

In certain embodiments, the device is made from solid hollow materials such as metals and titanium, and titanium based alloys.

In certain embodiments, the device is used by a user whereby the user is "within" the walker device and thus does not have to be reaching for the handles.

In certain embodiments, the device is used by a user to prevent falls and also to let the user walk straight without stooping/slouching.

The instant description, disclosure, and Figures are not to be limited by the embodiments as described, since these are given by way of example only and not by way of limitation.

Having thus described several embodiments for practicing the inventive method, its advantages and objectives can be easily understood. Variations from the description above may and can be made by one skilled in the art without departing from the scope of the invention, which is to be determined from and by the following claims.

The invention claimed is:

1. A wheeled walker comprising:

a lower frame comprising two foldable bars each having a front portion and a rear portion;

an upper frame comprising:

two vertical support struts extending upwards from the frame, the two vertical support struts being adjustable in height; and two horizontal arms connected to the two vertical support struts, wherein the two horizontal arms have a lower portion that is connected to the top of the vertical support struts, the lower portion extends rearwardly from the vertical support strut and then curves towards and past the vertical support strut, so that the two horizontal arms are configured to be placed under a user's arms at the armpits;

two sets of handles, the first set of handles being attached to the horizontal arms and the second set of handles being attached to the two vertical support struts, wherein the first set of handles is oriented approximately perpendicular to the horizontal arms;

two sets of brakes, the two sets of brakes attached to each of the two sets of handles on both the horizontal arms and the two vertical support struts; and a crossbar attached to each of the two vertical support struts, wherein when the two horizontal arms are placed under the user's arms at the armpits, the two horizontal arms provide weight support and stability to the user, wherein the two foldable bars are connected at the distal end of their rear portion to two rear wheels, wherein the two foldable bars are connected at the proximal end of their rear portion to the two vertical struts, wherein the two foldable bars are connected at the distal end of their front portion to the two vertical struts, wherein the two foldable bars are connected at their proximal end of the front portion to a single wheel, and wherein the two foldable bars are curved upwards from the distal to proximal ends of their rear portion and are curved downwards from their distal to proximal end of their front portion, wherein each of the two foldable bars has a concave shape.

2. The walker of claim 1, wherein the length of the horizontal arms does not cross the vertical plane encompassing the two rear wheels of the walker.

3. The walker of claim 2, wherein the length of the horizontal arms prevents the two rear wheels from becoming a fulcrum and the raising up the front walker wheel which may result in the walker user to fall backwards.

4. The walker of claim 1, where the horizontal arms are padded for comfort of use.

5. The walker of claim 1, wherein the walker is collapsible.

6. The walker of claim 1, wherein the two adjustable in height horizontal arms have a proximal bend portion, the proximal bend portion being connectable to the two vertical struts.

7. The walker of claim 1, wherein the walker is collapsible to take up less than half the volume of its volume when in an expanded state.

8. The walker of claim 1, wherein the wheels are not configured to rotate.

9. The walker of claim 1, wherein the two vertical support struts are adjustable and lockable.

* * * * *